United States Patent [19]

Engdahl

[11] 4,223,319
[45] Sep. 16, 1980

[54] PASSIVE MULTIELEMENT SHOCK RECORDER

[76] Inventor: Paul D. Engdahl, 2850 Monterey Ave., Costa Mesa, Calif. 92626

[21] Appl. No.: 974,340

[22] Filed: Dec. 29, 1978

[51] Int. Cl.³ .......................................... G01D 15/02
[52] U.S. Cl. ........................................ 346/7; 73/492; 188/297; 346/44; 346/139 R
[58] Field of Search ............... 346/7, 44, 77 R, 139 R; 73/492, 489; 188/297; 16/88

[56] References Cited

U.S. PATENT DOCUMENTS

| 969,641 | 9/1910 | Laughlin | 16/84 |
|---|---|---|---|
| 2,959,459 | 11/1960 | Ryan | 346/7 |
| 3,740,757 | 6/1973 | Engdahl | 346/7 |
| 3,974,504 | 8/1976 | Engdahl | 346/7 |

*Primary Examiner*—Joseph W. Hartary
*Attorney, Agent, or Firm*—Lawrence Fleming

[57] ABSTRACT

A seismic instrument or accelerograph for recording the spectra of strong earthquake shocks or the like, having a series of mechanically-resonant recording units which trace or "scratch" linear records with styli on metallic record plates. No electrical or other power source is needed to make the records, so that the instrument may stand by for many years without attention. The case has, typically, about sixteen separate compartments with a recording unit installed in each. Each unit has a different natural (resonant) frequency, in the range between about 1 to 32 Hz. The record plates are all alike, except for keying or locating grooves, and all the recording units are made to have about the same sensitivity in terms of stylus deflection per unit acceleration. A problem addressed here is that in any simple linear mass-spring system, the static sag (deflection of the mass at 1 g) is inherently related to the natural frequency by an inverse square law. The invention uses different types of recording units for different ranges of natural frequency, providing mechanical magnification or de-magnification between the seismic mass and the stylus. Medium- and high-frequency units are of the prior reed and platform types shown in my prior U.S. Pat. Nos. 3,683,397 and 3,974,504. Low-frequency units use a novel unbalanced torsional mechanism described herein. All units are preferably damped to about 2 percent of critical by an improved air dashpot device.

11 Claims, 14 Drawing Figures

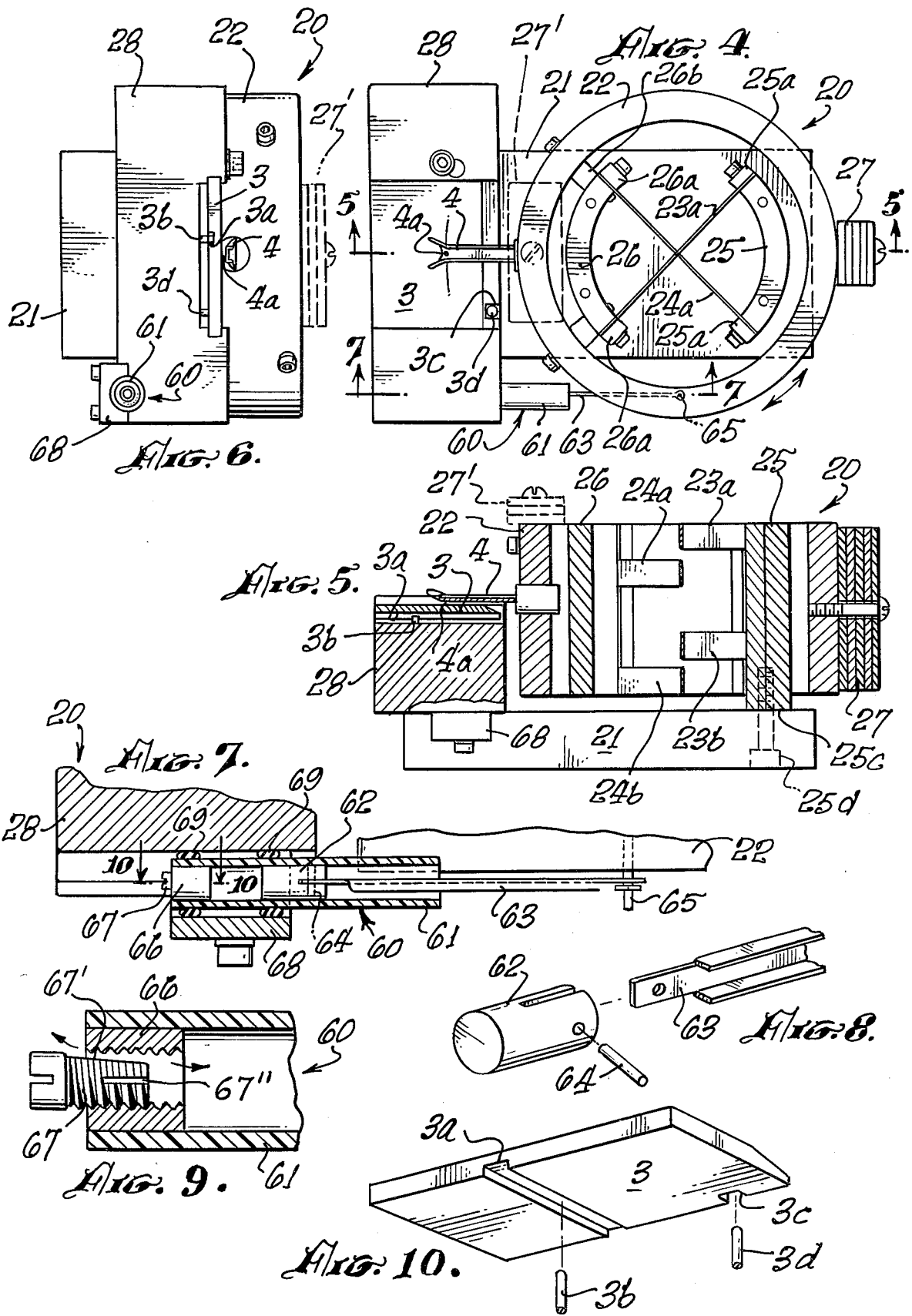

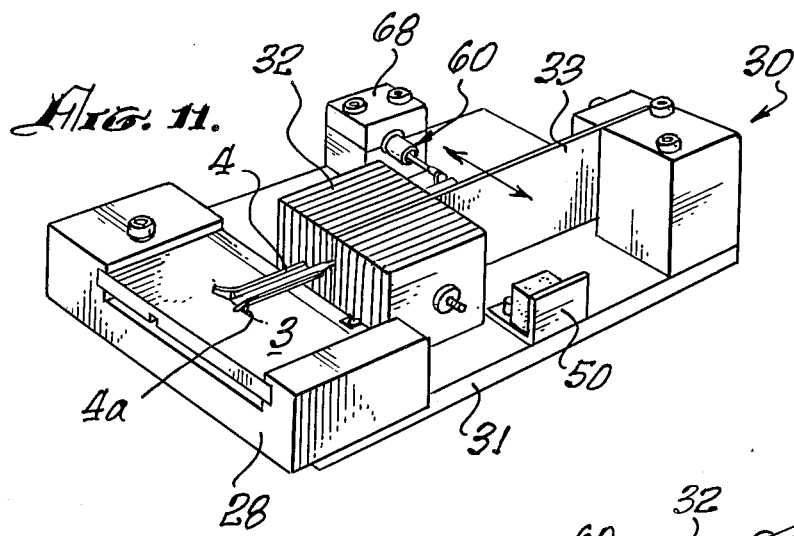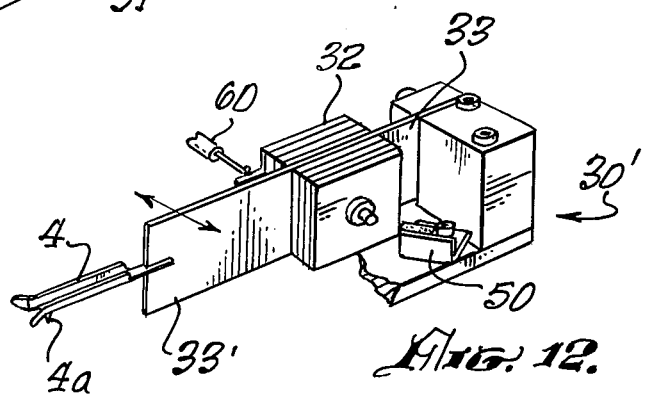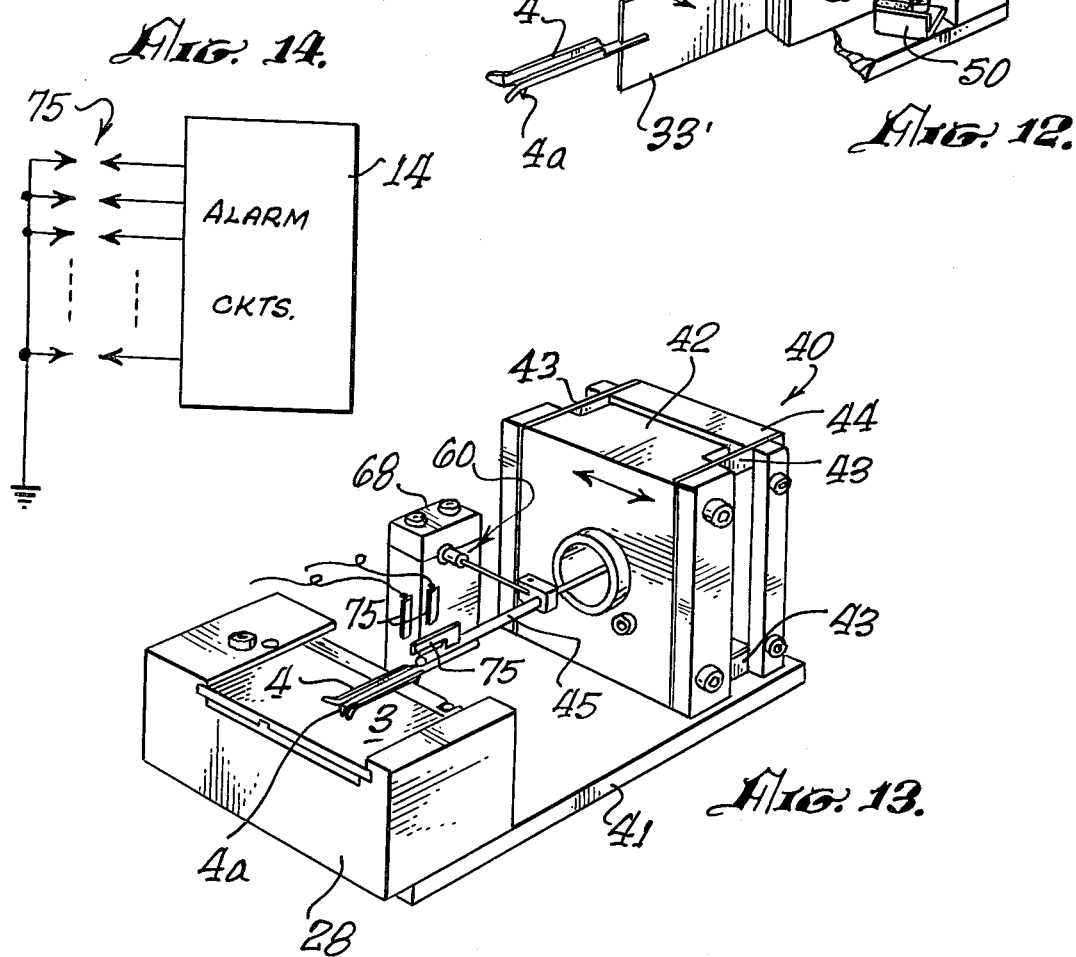

PASSIVE MULTIELEMENT SHOCK RECORDER

BACKGROUND

1. Filed of Invention

Strong-motion accelerographs are often installed in major structures to record earthquake shocks which they may receive. Battery-powered instruments require periodic maintenance, and their records are subject to destruction by heat. For better overall reliability in sensitive locations, such as power and chemical plants, additional instruments are often installed of a type which requires no external power nor recording tape, film, or paper, but employs passive resonant seismic elements which make stylus traces or "scratches" on metallic record plates. From the peak excursions of a series of traces made with elements or units of different natural frequencies, it is possible to reconstruct the shock response spectrum. An instrument of this type is described in my prior U.S. Pat. No. 3,740,757. That instrument employs an array of, typically, twelve resonant reeds, each carrying a stylus, having natural frequencies ranging from about 2 Hz to 25.4 Hz.

A need has arisen for an instrument of this general type that is somewhat more compact and contains more recording channels covering a wider range of natural frequencies, with constant sensitivity per channel. The instrument of the above prior patent cannot be merely adapted to do this; a new approach is required.

2. Prior Art

The closest prior art of which I am aware is in the following U.S. Patent Nos:

(a) Engdahl 3,683,397
(b) Engdahl 3,740,757
(c) Engdahl 3,795,006
(d) Cohen 3,800,921
(e) Engdahl 3,974,504
(f) Engdahl 4,100,807

Patents (a)–(c) show the basic recording principle used here, with (a) and (b) showing arrays of resonant reeds of graduated natural frequencies. Reference (d) shows an air dashpot damper; (e) shows a magnifier-type recording unit using the "platform" mechanism which is also used herein; (f) shows another reedtype unit.

BRIEF SUMMARY

A set of "scratch"-type seismic recording units or accelerographs is mounted in a common case. Typical sensitivities are ±2 to ±10 g full-scale. The case is preferably a metal casting having a series of compartments, one for each recording unit.

The general mode of operation of the whole instrument is similar to that described in my prior U.S. Pat. No. 3,740,757 of June 19, 1973. There, each of a series of stylus-carrying cantilever reeds is loaded with a suitably different seismic mass or weight to provide a series of acceleration recording units of graded natural frequencies, ranging from, e.g., 2 to 25 Hz. Typically, twelve reeds were used. Their sensitivities in terms of stylus displacement per unit acceleration are not all the same.

The present invention provides for a larger set of, e.g., sixteen recording units covering a wider range of natural frequencies. Unlike the reeds in my above prior patent, each recording unit is self-contained with its own individual base and frame structure, and each separately calibrated before mounting in the case. Different types of units are used in different natural frequency ranges. They are installed in the case or housing in combinations according to the sensitivities and natural frequencies required by the user.

The record plates are preferably all the same size and shape, and similar to that shown in FIGS. 9–12 of my prior Patent No. 3,974,504 of August 10, 1976. The plates are keyed, similarly, so that each plate will fit only one particular recording unit.

It is known that a simple rectilinear mass-spring system has a "static sag" $y_o$, which is related to its angular natural frequency $\omega_o$ by:

$$y_o = g/\omega_o^2$$

where g is the acceleration of gravity. If $y_o$ is expressed in cm and the natural frequency $f_n$ in Hz, this reduces to approximately $$y_o = \frac{24.8}{f_n^2}$$

Since the static-sag deflection $y_o$ of the mass varies as the inverse square of the natural frequency $f_n$ of the mass-spring system, it is not possible to make a set of simple elementary mass-spring accelerograph units covering a wide range of natural frequencies with all having similar sensitivities in terms of deflection y per unit acceleration. However, by the use of lever-like magnification and demagnification, it is possible to control the sensitivity (from proof or inertial mass to stylus) in large steps. Thus, units of low natural frequency can be made to have relatively low sensitivity, and units of high natural frequency to display higher sensitivity than an equivalent simple mass-spring system. Hence, the inverse square law limitation can be overcome by providing positive and negative magnification for different ranges of natural frequency. Inside any frequency range of, say, 1 to 3 octaves, adjustments can be made on a single type of sensor. Thus, the range of, say, 1 to 32 Hz can be covered with three basic types of unit or sensor.

In the present invention, the lower-frequency units are of novel construction. The record plates being small, the stylus displacement is demagnified compared to the acceleration-induced deflection of a simple mass-spring system of the same natural frequency. These units employ torsional mass-spring systems whose sensitivity to linear acceleration, when they are balanced, is zero. The sensitivity is then adjusted upward, as required, by unbalancing the system with suitable weights. Such units or sensors are used up to about 5 or 6 Hz.

Like all units in the present instrument, these are damped to about 2 percent of critical. A small air dashpot, having novel features, is the preferred damping device.

From about 5 or 6 Hz to about 16 Hz, reed-type sensors are satisfactory. These are preferably generally like those in my prior U.S. Pat. No. 3,750,757.

For natural frequencies above about 16 or 20 Hz, the static sag (determining the basic sensitivity of a simple mass-spring system) becomes small; and it is necessary to provide magnification between the proof or inertial mass and the stylus. Accordingly, recording units are preferably used such as those in my prior U.S. Pat. No. 3,974,504. These are called therein "platform-type" devices; the proof mass or inertial mass is suspended on parallel flexures for approximately linear displacement (instead of arcuate, as in a reed), and its displacement is magnified by lever means.

In practice in the present invention, all the above types of units are adjusted to about standard sensitivities of ±2 g, ±5 g, or ±10 g for a full-scale deflection of the stylus at the record plate of typically 1 cm or about 0.4 inch. The choice of the type of unit depends on the sensitivity chosen, as well as the natural frequency.

The housing or case is preferably a metal casting with about sixteen compartments, each about 8.5 by 8.5×11 cm, all closed by gasketed covers. There may be eight compartments or "pigeon holes" with a common cover on each side of the structure. Preferably, the complete instrument is mounted in place by a single large screw or bolt which passes clear through the central portion of the case. A separate recording unit is mounted in each compartment. The units may be mounted horizontally or vertically to the floors or the sidewalls of the compartments. A typical installation may include three complete instruments arranged to sense acceleration in the X, Y, and Z directions. In the Z-instrument, the recording units are mounted on the compartment sidewalls.

Electrical contacts may be provided on any or all of the units to actuate alarm devices when a predetermined level of acceleration is sensed. The alarm circuits are not part of the present invention and may be the same as those shown in FIGS. 6-8 of my prior U.S. Pat. No. 3,795,006.

DETAILED DESCRIPTION

In the Drawings:

FIG. 4 is a top view of a novel torsional accelerograph unit;

FIG. 5 is a section on line 5—5 of FIG. 4;

FIG. 6 is an end view of FIG. 4;

FIG. 7 is an enlarged section on line 7—7 of FIG. 4;

FIGS. 8 and 9 are enlarged details of parts of FIG. 7;

FIG. 10 is a perspective view of a record plate, seen from below;

FIG. 11 is a perspective view of a reed-type accelerograph unit;

FIG. 12 is a partial perspective view of a modification of FIG. 11;

FIG. 13 is a perspective view of a magnifier or platform-type accelerograph unit; and FIG. 14 is a block diagram of an electrical alarm system.

Figure 1:
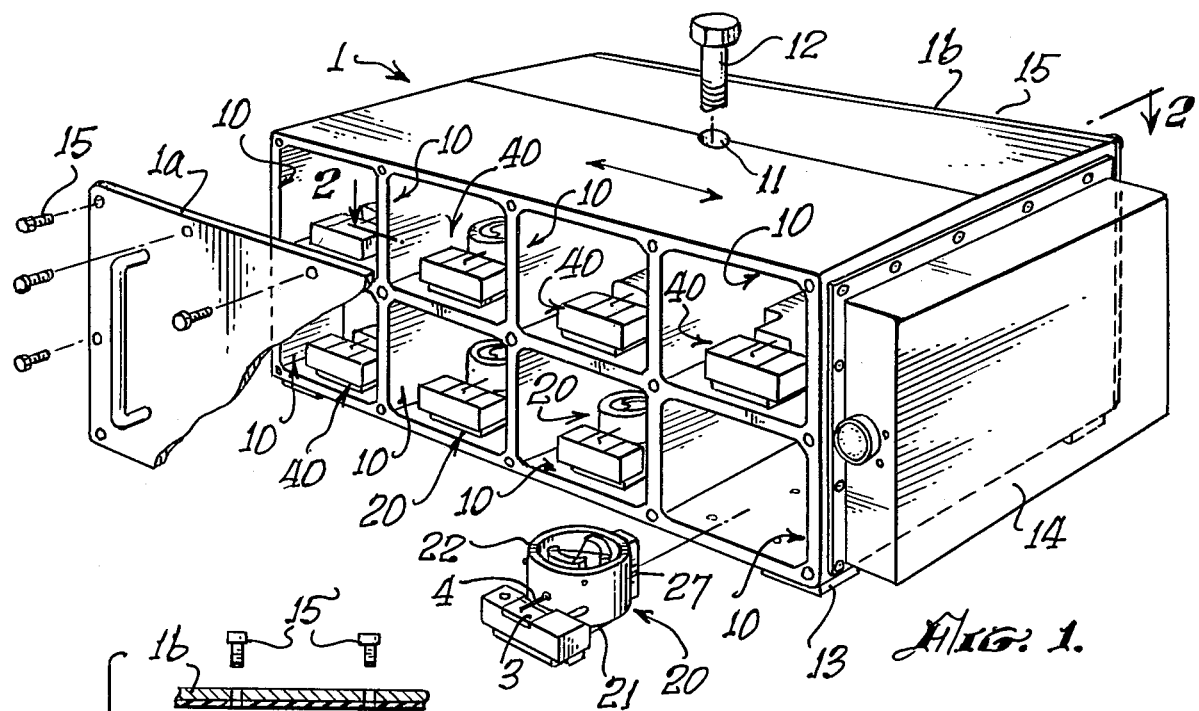
FIG. 1 is a perspective view of a complete instrument with a cover removed.

Referring first to FIG. 1, a complete instrument comprises a housing generally indicated at 1, containing compartments 10 closed with front and back common cover plates 1a, 1b. An accelerograph or recording unit is mounted in each of the compartments 10. These units may be of any of the types herein designated 20, 30, or 40, to be described later.

Case 1 is preferably a unitary metal casting with integral feet 13 (preferably three feet) and a central through-hole 11. To mount the instrument in place, a single large screw or bolt 12 is run through hole 11 and down into the supporting structure. Screw 12 may be about 1.9 cm (¾ inch) in diameter. The relation of the hole 11 to the compartments 12 is shown best in the section of FIG. 2. It is bounded by solid walls, for rigidity and watertightness.

Figure 3:
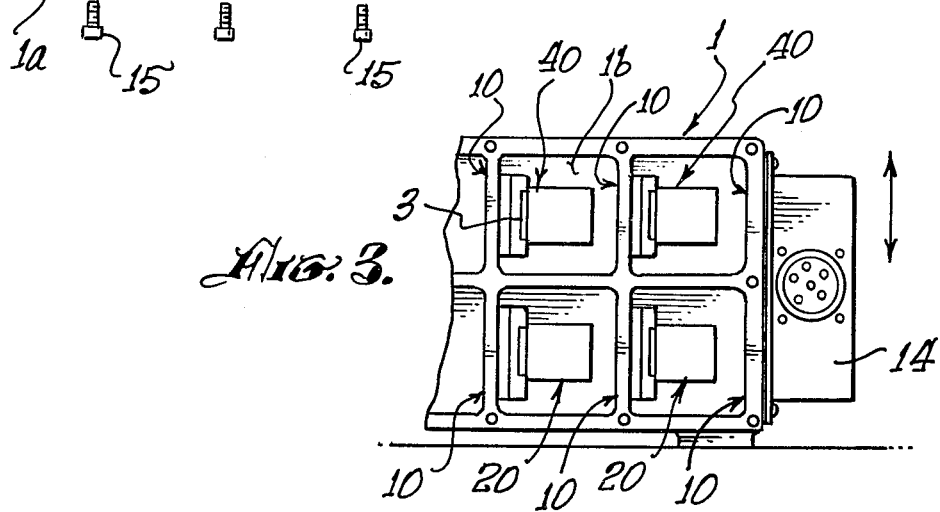
FIG. 3 is a partial front view.

The accelerograph or recording units may be mounted on the floors of the compartments 10 for sensing horizontal motion, or on the sidewalls for sensing vertical motion. The latter arrangement is indicated in FIG. 3. Suitable mounting holes are provided in each compartment floor or wall.

Figure 2:
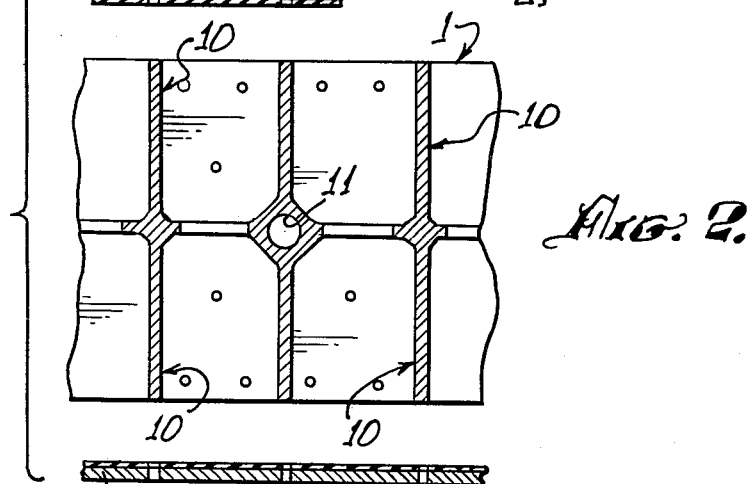
FIG. 2 is a partial section on line 2—2 of FIG. 1.

The covers 1a, 1b are preferably gasketed and held in place by suitable screws or quarter-turn fasteners 15, FIGS. 1 and 2.

A suitable box 14 may be provided, as shown, to house electronic circuitry to actuate alarm devices in response to the closure of contacts on recording units when the acceleration exceeds some predetermined level. These are briefly described later; the circuitry may be the same as in my prior U.S. Pat. No. 3,795,006, FIGS. 6-8.

Three basic types of recording units are normally used in any single instrument, each mounted in its individual compartment 10. The reasons have been described above under "Brief Description". The novel, demagnifying, low-frequency unit 20 is described below in connection with FIGS. 4-6. The prior reed-type unit 30 and its modification 30', which are shown basically in my prior U.S. Pat. No. 3,740,757, is shown in FIGS. 11-12. The prior magnifier or platform-type high-frequency unit 40 is described in my prior U.S. Pat. No. 3,974,504 and shown here in FIG. 13.

All these units are preferably damped to about 2 percent of critical. A novel improved air dashpot 60 for this purpose is shown in detail in FIGS. 7-9.

The novel low-frequency demagnifying accelerograph unit indicated generally at 20 will now be described in detail. Referring to FIGS. 4-6, the unit 20 utilizes a torsional mass-spring system with, preferably, a hollow cylindrical "proof mass" 22 suspended for oscillatory rotation about its axis by two pairs of flat spring strips 23a, 24a and 23b, 24b. These operate in the known manner of cross-strip hinges or pivots. In FIG. 4, the left-hand ends of spring strips 23, 24 are attached to the inside of mass 22 via clamp means 26a and cylindrical segment member 26, which is in turn fastened to mass 22, as with screws and spacers 26b. The right-hand, stationary ends of strips 23, 24 are fastened as by clamping at 25a to a stationary cylindrical-segment-shaped mounting element 25, which is fastened to the base 21. FIG. 5 shows the attachment point at 25c, utilizing screws or the like 25d.

One side of torsional mass 22 carries a stylus carrier 4 with a stylus 4a, which makes an arcuate linear record on record plate 3. These elements are preferably made and operate similarly to the corresponding elements 8, 6, and 7 in FIGS. 3 and 6 of my prior U.S. Pat. No. 3,974,504. The stylus carrier 4, stylus carrier 4a, record plate holder 28, and record plates 3 are preferably the same in all the recording units shown herein, including those of FIGS. 11-13, except for the plate keying.

FIG. 10 shows the keying means of a record plate 3 for completeness of illustration; the system is the same as in FIGS. 9-12 of the above prior patent. Each plate may have a bottom groove 3a and a notch 3c, which pass over pins 3b, 3d, respectively, located in the mounting block 28. The groove and notch locations must agree with those of the pins, or the plate cannot be inserted all the way. The pin and notch locations are varied so that each plate is keyed to a specific recording unit.

Continuing with FIGS. 4-6, it is evident that if the torsional proof mass 22 is balanced about its axis, it will not move in rotation when the instrument experiences linear acceleration. Hence, the basic linear sensitivity is zero, no matter what the natural frequency may be. To provide the unit with a desired value of sensitivity to linear acceleration, the torsional mass 22 is unbalanced to the desired degree, as by attaching a suitable weight to one side. Such an unbalancing mass is shown at 27 and 27' in FIGS. 4–5. It may be at either location. The natural frequency $f_n$ of the system is determined mainly by the moment of inertia of torsional proof mass 22 and the torsional stiffness of the cross-strip "hinge" or suspension 23a, 23b, 24a, 24b, FIGS. 4–5, so long as the unbalancing mass 27 is relatively small, i.e., when the demagnification ratio is large. Demagnification ratios of 100 (magnification of x. 0.01 ) are readily attained.

Obviously, the torsional proof mass 22 may take a form other than cylindrical, e.g., dumbbell-shaped, so long as it is balanced. Mass 22 may typically be made of aluminum or steel with an outside diameter of about 70 mm, inside diameter of 56 mm, and height of about 38 mm. For a natural frequency $f_n$ of 1 Hz, the spring strips 23–24 may be of beryllium copper, each about 6 mm wide and 0.15 mm thick. The unbalancing mass 27, as well as the proof masses in the reed-type units of FIGS. 11–12, is conveniently made up of a stack of stampings.

For higher natural frequencies, a reed-type unit 30 is preferred, FIG. 11. This employs a prior cantilever reed 33, proof mass 32, stylus carrier 4 with stylus 4a, record plate 3, and mounting block 28, as in my above prior U.S. Pat. No. 3,740,757. The base 31, however, is made so as to fit in a compartment 10 of case 1. Damping at about 2 percent of critical is preferably provided by the improved air dashpot indicated generally at 60, to be described later.

The partial view of FIG. 12 shows a similar reed-type unit indicated generally as 30', modified to give some magnification. The proof mass 32 is moved back along reed 33 so that the free end portion 33' of reed 33 acts as a magnifying lever. Suitable stops are preferably provided on all units to limit the displacement, as at 50 in FIGS. 11–12.

For the highest natural frequencies, the platform-type unit indicated generally at 40, FIG. 13, is preferred. This is the same as in FIG. 6 of my above prior U.S. Pat. No. 3,974,504, except for the base 41 (made to fit in a compartment 10 of case 1) and the light damping by improved air dashpot 60. Proof mass 42 is constrained to move linearly (rather than in an arc as in reed-type unit 30) by the four parallel flexure strips 43. Lever 45 provides the magnification, which can be typically as high as x12. Base element 44, to which the root ends of flexure strips 43 are anchored, is, of course, fastened to the base plate 41; mass 42 moves along the direction of the arrow.

Electrical contacts 75, of suitable construction, are shown in FIG. 13, their mountings omitted for clarity. These contacts are preferably of thin spring stock, gold-plated, and operate with a semi-wiping action. Such contacts may be provided, as desired, on any of the units 20,30,40. The stationary contacts are positioned to be closed when the deflection of the stylus carrier 4 reaches a predetermined value.

FIG. 14 shows diagrammatically an alarm system actuated by the closure of such contacts 75 to signal the receipt of a predetermined magnitude of shock acceleration. The circuits in box 14 may be the same as in FIGS. 6–8 of my prior U.S. Pat. No. 3,795,006 and do not form a part of the present invention.

Table I shows typical allocations of the different types of accelerograph units 20,30,40 in a complete 16-unit instrument. In the first line of Table I, for example, unit No. 1, having a natural frequency $f_n$ of 1 Hz, would be of Type 20 for sensitivities of plus or minus 2, 5, or 10 g (1 g is the acceleration of gravity). For a natural frequency of 25.4 Hz, unit No. 15 would be Type 40 for a range of 2 g, but preferably Type 30 for ranges of 5 and 10 g: the required mangification being lower at the lower sensitivities, and conveniently attained with a reed-type unit as 30', FIG. 12.

TABLE I

| Unit No. | $f_n$ Hz | Type and magnification for full-scale sensitivity of: | | |
|---|---|---|---|---|
| | | 2g | 5g | 10g |
| 1 | 1. | 20 × .01 | 20 × .004 | 20 × .002 |
| 2 | 1.3 | 20 × .016 | 20 × .0064 | 20 × .003 |
| 3 | 1.6 | 20 × .024 | 20 × .010 | 20 × .0048 |
| 4 | 2. | 20 × .041 | 20 × .017 | 20 × .008 |
| 5 | 2.5 | 20 × .065 | 20 × .026 | 20 × .0125 |
| 6 | 3.2 | 20 × .11 | 20 × .042 | 20 × .020 |
| 7 | 4. | 20 × .17 | 20 × .067 | 20 × .033 |
| 8 | 5. | 20 × .26 | 20 × .10 | 20 × .051 |
| 9 | 6.4 | 20 × .42 | 20 × .17 | 20 × .083 |
| 10 | 8. | 30 × .65 | 20 × .26 | 20 × .13 |
| 11 | 10.1 | 30 × 1.05 | 20 × .42 | 20 × .21 |
| 12 | 12.7 | 30 × 1.7 | 30 × .67 | 20 × .33 |
| 13 | 16. | 30 × 2.6 | 30 × 1.05 | 20 × .51 |
| 14 | 20.2 | 30 × 4.2 | 30 × 1.7 | 30 × .83 |
| 15 | 25.4 | 40 × 6.7 | 30 × 2.7 | 30 × 1.3 |
| 16 | 32. | 40 × 10.5 | 40 × 4.2 | 30 × 2.1 |

Referring now to FIGS. 7–9, the improved air dashpot indicated generally at 60 preferably employs a graphite piston 62 sliding in a glass cylinder 61 in known manner. Since the damping coefficient required in all units is about 2 percent of critical, damper 60 is quite small. Typically, the bore may be about 3.5 mm and the stroke about 18 mm.

The end of a light sheet-metal piston rod 63, which is formed into a channel shape, FIG. 8, is retained in a slot in piston 62 by a small pin 64. The other end of rod 63 engages a pin on the proof mass, as at 65, FIG. 7. This construction minimizes sliding friction and binding, which must be kept very low. The predominant sliding frictional force in the recording system is that of the stylus 4a on record plate 3; this is typically of the order of 160 milligrams.

The damping or viscous force obtained per unit velocity is determined by the area of the air vent opening in a plug 66 in the end of cylinder 61, FIG. 9. A novel simplified variable vent is provided by screw 67. This is an ordinary set screw which has been ground off or machined off along one side at an angle to its axis, as at 67', FIG. 9. So long as less than 180° is ground off its circumference,, the screw will work normally, but will leave a segment-shaped open area along its side. This vent area is decreased by running the screw farther in, and vice versa. Screw 67 is preferably made from a commerical set screw of the type having a deformable insert 67", as of nylon, along one side to prevent its working loose. The deformable insert also prevents air from bypassing the segment-shaped opening by closing off the helical clearance between the male and female screw threads.

Dashpot cylinder 61 is preferably mounted between oversized cutouts on a retaining block 68, FIGS. 6, 7, 11, and 13, with resilient O-rings, or the like, 69 inbetween, to eliminate the hazards of slippage and of local stresses on the glass.

I claim:

1. A multi-unit accelerograph instrument comprising:
a case having a plurality of contiguous similar walled compartments; and
a plurality of accelerograph units mounted one in each said compartment and including units of different types,
each said unit comprising a lightly-damped resonant mass-spring system and a recording element moved thereby across a recording medium and having a predetermined sensitivity in terms of recording element deflection per unit acceleration, and a predetermined natural frequency,
said natural frequency being graded over a range of at least about 10 to 1 among said units, and
said sensitivity being generally about the same predetermined value in all said units, and
mechanical magnifying and demagnifying means in at least some of said units adjusted to bring all their sensitivities to about said predetermined value.

2. An instrument as in claim 1, wherein:
said units are selected from a first, a second, and a third type,
said first type comprising a low-frequency torsional mass-spring system with a predetermined unbalancing mass,
said second type comprising a mid-frequency resonant reed, and
said third type being of higher natural frequency and comprising a platform-like mass constrained to linear displacement and a magnifying lever means coupled thereto.

3. An instrument as in claim 2, wherein:
said case is generally parallelepipedal in shape with each said compartment generally square in cross-section,
said case having a central through-hole for reception of a single mounting screw, and
all said units being mountable on either a floor or a sidewall of a said compartment for response either to horizontal or to vertical motion, respectively.

4. An instrument as in claim 3, wherein:
said case has a major front and rear face portion, each defining the openings of about eight said compartments, and further comprising
a generally flat cover fastenable over each said face to cover all said compartments.

5. An instrument as in claim 2, wherein:
all said recording elements are dry styli, and
all said recording media are generally-small metal plates with coatings markable by said styli,
said plates differing only in mechanical keying means that permit each said plate to be insertable only in a predetermined said unit.

6. An accelerograph unit comprising:
a torsional resonant mass-spring system having a torsional proof mass and a torsional spring means connecting said mass to a base member for angular oscillation about the approximate axis of inertia of said mass; and
a recording element extending from said proof mass,
said proof mass being balancable to provide substantially zero sensitivity to linear acceleration, and
an unbalancing mass attached to said proof mass and providing a predetermined sensitivity to said linear acceleration,
said predetermined sensitivity at said recording element being substantially low compared to the static sag ratio of a simple linear mass-spring system of the same natural frequency.

7. An accelerograph unit as in claim 6, wherein:
said torsional proof mass has a central opening, and
said torsional spring means comprises a cross-strip suspension inside said opening.

8. An accelerograph unit as in claim 6, wherein:
said torsional proof mass is shaped generally as a hollow cylinder, and
said torsional spring means comprises a pair of cross-strip hinge-like suspension elements connected between an inner surface portion of said cylinder and a mounting element extending upward from said base member,
said recording element being a stylus-carrying arm extending from one side of said cylinder, and
said unbalancing mass being attached to said cylinder.

9. An accelerograph comprising:
a resonant mass-spring system and a recording element connected thereto;
a recording medium mounted in marking relation to said element, and
a damper damping said resonant system and comprising:
an air cylinder, a piston, and a piston rod which connects said piston to said mass,
said piston having at one end a diametral slot intersected by a hole,
said piston rod having a flat end portion fitting rockably in said slot and retained therein by a pin through said hole;
a plug in one end of said cylinder,
a tapped hole through said plug, and
adjusting screw means in said tapped hole to adjust the venting of air therethrough to adjust the damping forces presented to said piston,
and wherein said piston rod is of light sheet metal with its middle portion bent into a channel-like shape, and having a hole-and-pin connection at each end.

10. An accelerograph as in claim 9, wherein said cylinder is of glass and said piston of graphite, and
said adjusting screw means is a screw with a portion removed along one side to leave a flat surface inclined to the axis of said screw to taper toward its inner end, and further comprising:
a mounting block fastening said cylinder to a frame member and having a cylinder-receiving opening larger than said cylinder, and
a resilient ring-like securing member between said cylinder and said opening.

11. An accelerograph as in claim 10, wherein said adjusting screw is further provided with a deformable insert in its side portion to lock said screw in place and to seal a portion of the helical clearance between screw threads to prevent leakage of air therearound.

* * * * *